(12) United States Patent
Okazaki et al.

(10) Patent No.: US 6,254,715 B1
(45) Date of Patent: Jul. 3, 2001

(54) PROCESS FOR PRODUCTION OF ELECTRONIC COMPONENT HAVING TERMINAL ELECTRODE

(75) Inventors: Mitsuo Okazaki, Tokyo (JP); Ken Takekawa, Jonesboro; Andy Greene, Williamson, both of GA (US)

(73) Assignee: TDK Corporation, Tokyo (JP)

(*) Notice: Subject to any disclaimer, the term of this patent is extended or adjusted under 35 U.S.C. 154(b) by 0 days.

(21) Appl. No.: 09/273,274

(22) Filed: Mar. 22, 1999

(51) Int. Cl.$^7$ .............................. B32B 31/24; B32B 31/26
(52) U.S. Cl. ..................... 156/280; 156/89.12; 156/278; 427/123; 29/25.03
(58) Field of Search .............................. 156/89.12, 89.14, 156/89.16, 278, 280; 361/321.2, 321.3; 427/299, 314, 123, 125; 29/25.03

(56) References Cited

U.S. PATENT DOCUMENTS

| | | |
|---|---|---|
| 4,381,321 | 4/1983 | Braden . |
| 4,526,129 | 7/1985 | Braden . |
| 4,561,954 * | 12/1985 | Scrantom et al. . |
| 4,859,498 * | 8/1989 | Yamaguchi . |
| 5,312,581 * | 5/1994 | Amano et al. . |
| 5,364,014 * | 11/1994 | Hamuro et al. . |
| 5,632,813 * | 5/1997 | Nakagawa et al. . |

FOREIGN PATENT DOCUMENTS

| | | |
|---|---|---|
| 57-207328 | 12/1982 | (JP) . |
| 58-90718 | 5/1983 | (JP) . |
| 2-305401 | 12/1990 | (JP) . |
| 4-352309 | 12/1992 | (JP) . |
| 7-29773 * | 1/1995 | (JP) . |

* cited by examiner

Primary Examiner—Curtis Mayes
(74) Attorney, Agent, or Firm—Oblon, Spivak, McClelland, Maier & Neustadt, P.C.

(57) ABSTRACT

A process for production of an electronic component having terminal electrodes comprising heat treating the electronic component element to be formed with first and second terminal electrodes in a state held by a rubber member, then coating the initial first terminal electrode paste, whereby, even in the step of applying the initial electrode paste, the wettability of the surface of the element by the electrode paste is improved and, as a result, the coating edge of the electrode paste becomes straight without becoming wavy or rounded due to the surface tension with the element as in the past and the edge of the terminal electrodes formed by drying the paste coated portions also become straight. Further, the electronic component element to be formed with terminal electrodes may be coated with the electrode paste after immersing it in a solution containing a silicone oil and drying it.

15 Claims, 5 Drawing Sheets

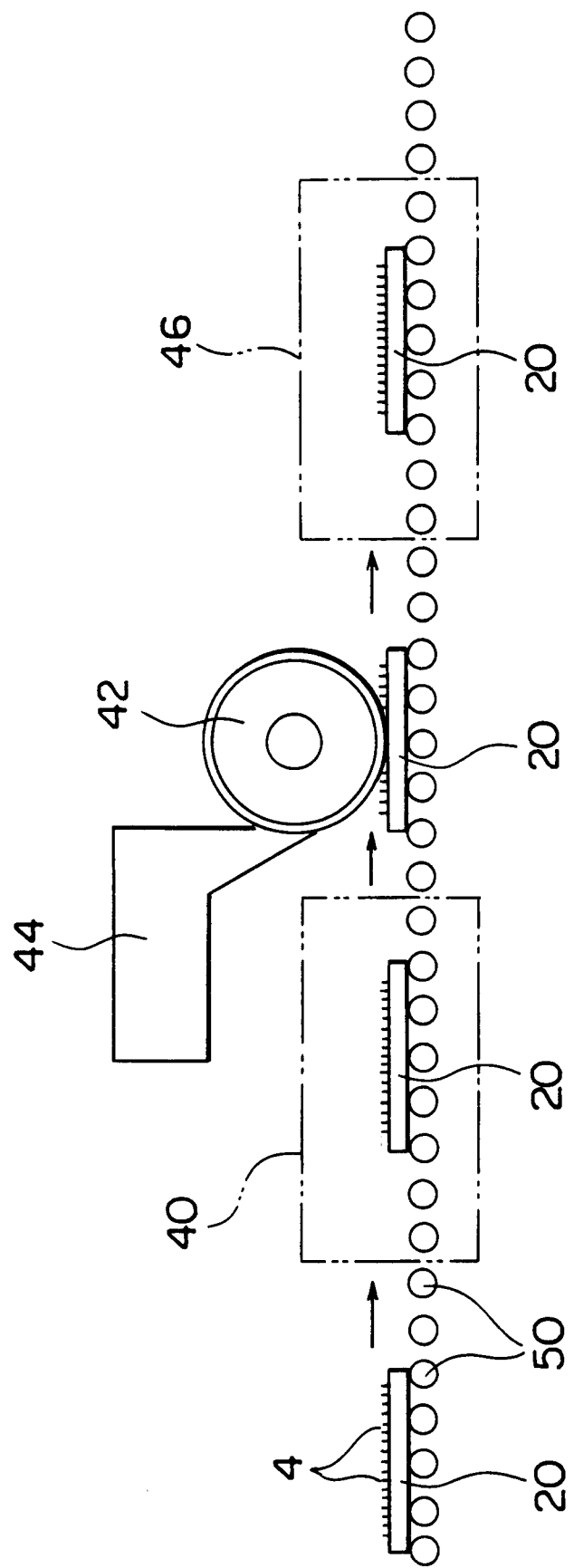

PROCESS FOR PRODUCTION OF ELECTRONIC COMPONENT HAVING TERMINAL ELECTRODE

BACKGROUND OF THE INVENTION

1. Field of the Invention

The present invention relates to a process for production of an electronic component having a terminal electrode.

2. Description of the Related Art

A typical electronic component having terminal electrodes is a stacked ceramic capacitor. To form the terminal electrodes of such a stacked ceramic capacitor, a capacitor element with stacked internal electrodes is produced, then an electrode paste is coated and dried on the two ends of the capacitor element.

Since it is difficult to coat an electrode paste simultaneously on the two ends of the capacitor element, normally the electrode paste is coated and dried on one end of the capacitor element to form a first end electrode, then the electrode paste is coated and dried on the other end of the element to form a second end electrode.

In this method of the related art, however, differences occurred in the shape of the first end electrode formed first at one end of the capacitor element and the shape of the second end electrode formed second and there was a tendency for the appearance to become unbalanced. In recent years, further, stacked ceramic capacitors have tended to be made increasingly smaller with sides of less than 1 mm. If an unbalance occurs in the shape of the two terminal electrodes, the distance between the two terminal electrodes may become narrower and cause sparks at the time of application of a test voltage, whereby the product will be judged defective and have to be disposed of even without any internal defects and consequently the manufacturing yield will fall. Further, if an unbalance occurs in the shapes of the two terminal electrodes, when mounting the stacked ceramic capacitor on the board, the problem will also arise of easier short-circuiting of the electrodes or mounting defects.

In particular, while the edge shape of the second end electrode formed second is relatively straight, the edge shape of the first end electrode formed first is wavy or rounded and there is a great variation in the dimensions of the edge shape. This has become a factor causing an unbalance in the shapes of the two terminal electrodes.

In the past, there has been no accurate recognition of the terminal electrodes. While various improvements have been made, none have been sufficiently effective.

SUMMARY OF THE INVENTION

An object of the present invention is to provide a process for the production of an electronic component having a terminal electrode such as a stacked ceramic capacitor which reduces the variation in dimension of the edge shape of the terminal electrode and enables the production, with a high production efficiency, of electronic components improved in reliability and durability.

The present inventors engaged in intensive studies to achieve the above object and as a result noticed that the edge shape of the second end electrode formed second was relatively straight and discovered that the cause of this was that the element to be formed with the terminal electrodes had been heat treated by the drying step along with the silicone rubber holding the element before the step of coating the second electrode paste and thereby completed the present invention.

That is, according to a first aspect of the present invention, there is provided a process for production of an electronic component having a terminal electrode comprising a heat treatment step of heat treating an electronic component element to be formed with a terminal electrode in a state held by a rubber member, a coating step of coating an electrode paste on the heat treated element, and a drying step of drying the element coated with the electrode paste.

According to a second aspect of the present invention, there is provided a process for production of an electronic component having a terminal electrode comprising a heat treatment step of heat treating an electronic component element to be formed with first and second terminal electrodes in a state held by a rubber member, a first coating step of coating a first terminal electrode paste on a first end of the heat treated element, a first drying step of drying the element coated with the first terminal electrode paste, a second coating step of coating a second terminal electrode paste on a second end of the element, and a second drying step of drying the element coated with the second terminal electrode paste on the second end.

In the present invention, the rubber member is preferably comprised of a member comprised mainly of a silicone rubber. The rubber member is not particularly limited and may be any shape such as a sheet, block, etc., but preferably is a sheet-shaped rubber member formed with a plurality of through holes for holding elements. When coating the electrode paste on the end of an element, it is preferable to mount the element in a through hole so that the end of the element is exposed from the through hole. In the heat treatment step, the element may be heat treated buried completely in the inside of the through hole, but in the same way as when coating the electrode paste on the end of the element, it is also possible to heat treat the element in a state mounted in a through hole so that the end of the element is exposed from the through hole.

According to a third aspect of the present invention, there is provided a process for production of an electronic element having a terminal electrode comprising a heat treatment step of heat treating an electronic component element to be formed with a terminal electrode together with a silicone rubber, a coating step of coating an electrode paste on the heat treated element, and a drying step of drying the element coated with the electrode paste. In the process of production according to the third aspect of the present invention, the element and silicone rubber do not necessarily have to be in contact, but it is preferable that they be in contact.

According to a fourth aspect of the present invention, there is provided a process for production of an electronic component having a terminal electrode comprising an immersion step of immersing an electronic component element to be formed with a terminal electrode in a solution containing a silicone oil, a coating step of coating an electrode paste on the element next, and a drying step of drying the element coated with the electrode paste. In the process for production according to the fourth aspect of the invention, after the immersion step, it is preferable to dry the element, then perform the coating step.

In the processes of production according to the first to third aspects of the present invention, the heating temperature in the heat treatment step is preferably 80° C. to 300° C., more preferably 150° C. to 300° C., further preferably 180° C. to 250° C. The heat treatment time is preferably at least 2 minutes, more preferably 5.0 to 10.0 minutes. The heat treatment temperature in the heat treatment step may be about the same extent as the drying temperature in the drying step.

If the heat treatment temperature is too low, the advantageous effect of the present invention becomes smaller, while if the temperature is too high, the advantageous effects of the present invention increase a little and the work efficiency declines. Further, if the heat treatment time is too short, the advantageous effect of the present invention is small, while if the heat treatment time is too long, the production efficiency tends to fall. Note that the heat treatment step may be performed by the batch method or continuously. The means for conveying the rubber member holding the element is not particularly limited. A belt conveyor, conveyor roller, etc. may be employed.

The element is not particularly limited, but for example may be a capacitor element formed by alternately laminating an internal electrode layer and dielectric layer.

In the process for production according to the first aspect of the present invention, since the electrode paste is coated after heat treating the electronic component element to be formed with a terminal electrode in a state held by a rubber member, the wettability of the element surface by the electrode paste is improved. As a result, the coated edges of the electrode paste become straight without becoming wavy or rounded by the surface tension with the element as in the past and therefore the edge of the terminal electrode formed by drying the paste coated portions also become straight. Therefore, according to the process for the production of the present invention, it is possible to reduce the variation in dimension of the edge shape of the terminal electrode and produce electronic components improved in reliability and durability with a high production efficiency.

In the process of production according to the second aspect of the present invention, the initial first end electrode paste is coated after heat treating the electronic component element to be formed with the first and second terminal electrodes in a state held by the rubber member. Therefore, even in the coating step for the initial electrode paste, the wettability of the element surface by the electrode paste is improved. As a result, the coated edge of the electrode paste become straight without any waviness or roundness caused by the surface tension with the element like in the past and the edge of the terminal electrode formed by drying the paste coated portion also become straight. Therefore, according to the process of production of the present invention, it is possible to reduce the variation in dimension of the edge shape of the first terminal electrode. Note that the variation in dimension of the second terminal electrode is suppressed in the same way as the variation in dimension of the edge shape of the first terminal electrode by the heat treatment conducted in the previous step or the heat treatment in the first drying step. Therefore, according to the process for production according to the second aspect of the invention, it is possible to produce electronic components improved in reliability and durability at a high production efficiency.

In the process of production according to the third aspect of the present invention, the electrode paste is coated after heat treating the electronic component element to be formed with a terminal electrode together with a silicone rubber. A similar mode of operation and advantageous effects as the process of production according to the first aspect of the present invention can be expected even by heat treating the electronic component element to be formed with the terminal electrode in a state not in direct contact with the silicone rubber.

In the process of production according to the fourth aspect of the present invention, the electrode paste is coated after immersing the electronic component element to be formed with the terminal electrode in a solution containing a silicone oil. A similar mode of operation and advantageous effects as the process of production according to the first aspect of the present invention are achieved even by immersing the electronic component element to be formed with the terminal electrode in a solution containing a silicone oil.

BRIEF DESCRIPTION OF THE DRAWINGS

These and other objects and features of the present invention will be explained in detail next with reference to the attached figures, in which:

FIG. 8 is a schematic view of a process for production of a stacked ceramic capacitor according to another embodiment of the present invention.

DESCRIPTION OF THE PREFERRED EMBODIMENTS (First Embodiment)

Figure 1:
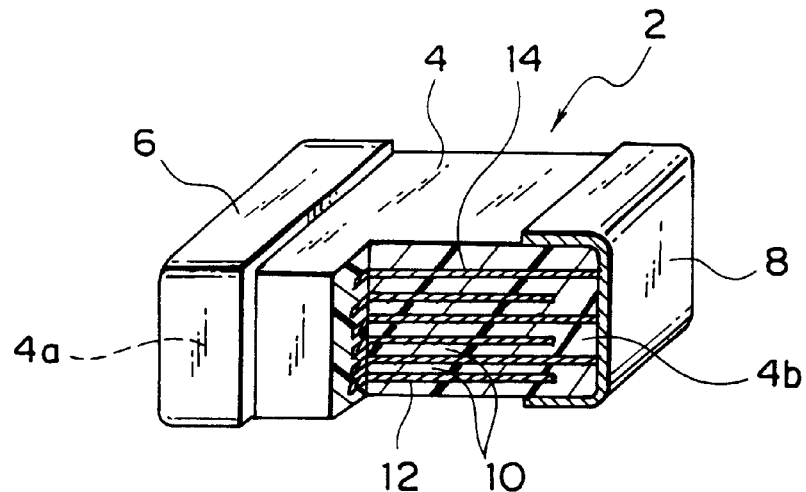
FIG. 1 is a partially cutaway perspective view of a stacked ceramic capacitor according to a first embodiment of the present invention.
Figure 2:
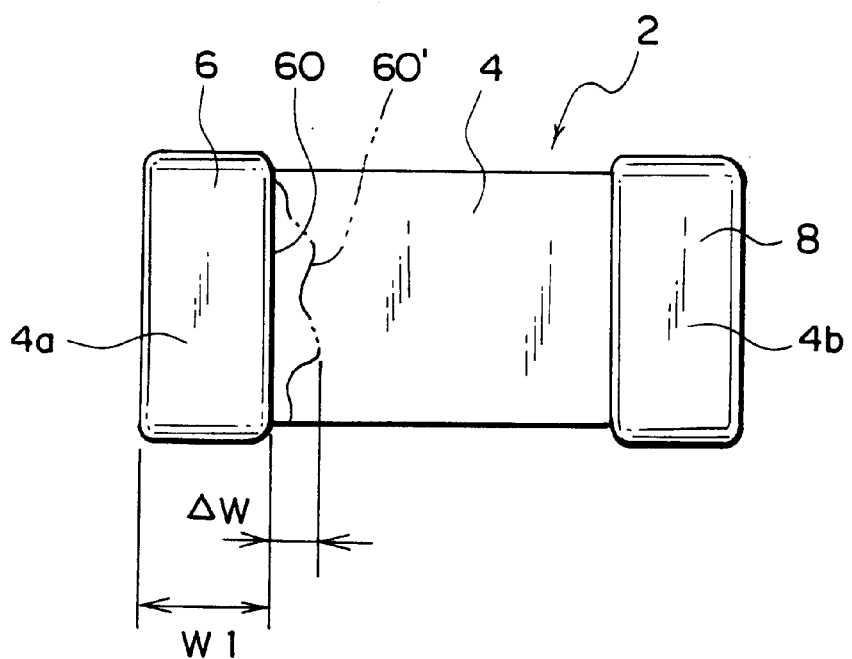
FIG. 2 is a plan view of a stacked ceramic capacitor.

In this embodiment, as an electronic component having terminal electrodes, the stacked ceramic capacitor 2 shown in FIG. 1 and FIG. 2 is illustrated as an example and its process of production explained.

Structure of Stacked Ceramic Capacitor

As shown in FIG. 1 and FIG. 2, the stacked ceramic capacitor 2 has a capacitor element 4, a first terminal electrode 6, and a second terminal electrode 8. The capacitor element 4 has dielectric layers 10, first internal electrode layers 12, and second internal electrode layers 14. The first internal electrode layers 12 and second internal electrode layers 14 are alternately stacked between the dielectric layers 10 to give a multilayer structure. One end of each of the first internal electrode layers 12 is electrically connected to the inside of the first terminal electrode 6 formed at the outside of the first end 4a of the capacitor element 4. Further, one end of each of the second internal electrode layers 14 is electrically connected to the inside of the second terminal electrode 8 formed at the outside of the second end 4b of the capacitor element 4.

In the present embodiment, the internal electrode layers 12 and 14 are formed by for example nickel, nickel alloy, or other metal layers. The nickel alloy is not particularly limited, but an alloy containing at least 95 wt % of nickel and at least one metal selected from manganese, chromium, cobalt, aluminum, etc. is preferable. Further, the nickel or nickel alloy may contain as a trace component not more than 0.1 wt % of phosphorus. The thicknesses of the internal electrode layers 12 and 14 are not particularly limited, but preferably are 1 to 5 μm, more preferably 2 to 3 μm.

The material of the dielectric layers 10 is not particularly limited and may be comprised for example of calcium titanate, strontium titanate, and/or barium titanate or other dielectric materials. The thickness of the dielectric layers 10 is not particularly limited, but is generally some $\mu$m to hundreds of $\mu$m.

The materials of the terminal electrodes 6 and 8 are also not particularly limited, but normally use is made of copper or a copper alloy, nickel or a nickel alloy, etc. It is also possible to use silver or an alloy of silver and palladium. The thicknesses of the terminal electrodes 6 and 8 are also not particularly limited, but normally are 10 to 50 $\mu$m or so.

The shape and size of this stacked ceramic capacitor 2 may be suitably selected in accordance with the objective and application. When the stacked ceramic capacitor 2 is a rectangular parallelepiped, it is normally 0.6 to 3.2 mm×0.3 to 1.6 mm×0.1 to 1.2 mm or so.

Process for Production of Stacked Ceramic Capacitor

The stacked ceramic capacitor 1 of the present embodiment may be produced in the following way.

First, the dielectric layer paste, internal electrode paste, and terminal electrode paste are prepared.

The dielectric layer paste is comprised of an organic solvent based paste obtained by kneading a dielectric material and an organic vehicle or an aqueous solvent based paste. The dielectric material may be suitably selected from a compound oxide or various compounds forming oxides, for example, carbonates, nitrates, hydroxides, and organic metal compounds and mixed for use.

The organic vehicle means a binder dissolved in an organic solvent. The binder used for the organic vehicle is not particularly limited. Ethyl cellulose, polyvinyl butyral, terpineol, and other various ordinary binders may be used. Further, the organic solvent is not particularly limited. Terpineol, butyl carbitol, acetone, toluene, and other organic solvents may be used.

Further, as the aqueous solvent used for the aqueous solvent based paste, a solvent comprised of an aqueous binder, dispersant, etc. dissolved in water may be used. The aqueous based binder is not particularly limited, but polyvinyl alcohol, cellulose, an aqueous based acrylic resin, emulsion, etc. may be used.

The internal electrode paste is prepared by kneading a conductive material comprised of the above mentioned various types of conductive metals or alloys or various oxides forming the above conductive materials after sintering, organic metal compounds, resinates, etc. with the above-mentioned organic vehicles. Further, the terminal electrode paste is also prepared in the same way as the internal electrode paste.

The content of the organic vehicle in the above pastes is not particularly limited. The normal content may for example be made 1 to 5 wt % or so for the binder and 10 to 50 wt % for the solvent. Further, the pastes may contain, in accordance with need, various additives selected from dispersants, plasticizers, glass frit, dielectrics, insulators, etc.

After preparing the pastes in this way, first, the capacitor element 4 shown in FIG. 1 is prepared. To prepare the capacitor element 4, the dielectric paste and the internal electrode paste are used and the printing process, transfer process, green sheet process, or other process is employed to alternately stack dielectric layers 10 and internal electrode layers 12 and 14 to give a stacked structure.

When using the printing process to obtain a stacked structure, the dielectric paste and internal electrode paste are successively printed on a polyethylene terephthalate or other support member, the member cut to a predetermined shape, and then the element peeled off from the member to first obtain a pre-sintering green chip. Further, when using the green sheet process, a green sheet is formed by the doctor blade method from the dielectric paste, the internal electrode paste is printed on top of this, then these are stacked and cut to obtain pre-sintered green chips.

Next, the green chip is treated to remove the binder and is sintered. The treatment for removing the binder is performed before the sintering and may be performed under ordinary conditions, but when using a base metal such as nickel or nickel alloy as the conductive material of the internal electrode layers, the treatment is performed in an air atmosphere at a rate of temperature rise of 5 to 300° C./hour, more preferably 10 to 100° C./hour, a holding temperature of 180 to 400° C., more preferably 200 to 300° C., and a temperature holding time of 0.5 to 24 hours, more preferably 5 to 20 hours.

The sintering atmosphere for the green chip may be suitably determined in accordance with the type of the conductive material in the internal electrode paste, but when using a base metal such as nickel or a nickel alloy as a conductive material, the oxygen partial pressure of the sintering atmosphere is preferably made $1\times10^{-8}$ to $1\times10^{-12}$ atmospheres. If the oxygen partial pressure is too low, the conductive material of the internal electrodes is abnormally sintered and ends up breaking, while if the oxygen partial pressure is too high, there is a tendency for the internal electrodes to be oxidized. Further, the holding temperature at the time of sintering is 1100 to 1400° C., more preferably 1200 to 1380° C. If the holding temperature is too low, the densification becomes insufficient, while if the holding temperature is too high, there is breakage of the electrodes due to abnormally sintering of the internal electrodes and a tendency for the capacity-temperature characteristic to deteriorate due to the diffusion of the internal electrode material.

As the other sintering conditions, the rate of temperature rise is 50 to 500° C./hour, more preferably 200 to 300° C./hour, the temperature holding time 0.5 to 8 hours, more preferably 1 to 3 hours, the cooling rate 50 to 500° C./hour, more preferably 200 to 300° C./hour, and the sintering atmosphere preferably a reducing atmosphere. As the gas of the atmosphere, for example, a mixed gas of nitrogen gas and hydrogen gas is preferably moisturized and used.

When sintering the chip in a reducing atmosphere, the sintered capacitor chip is preferably annealed. In the above-mentioned treatment for removing the binder, sintering, and annealing process, it is possible to use for example a wetter etc. to moisturize the nitrogen gas or mixed gas. The water temperature in this case is preferably 5 to 75° C.

The capacitor element 4 shown in FIG. 1 and FIG. 2 is obtained in this way. The thus obtained capacitor element 4 is for example end polished by barrel polishing or sand blasting, then the following method is used to form the terminal electrodes 6 and 8.

Figure 3:
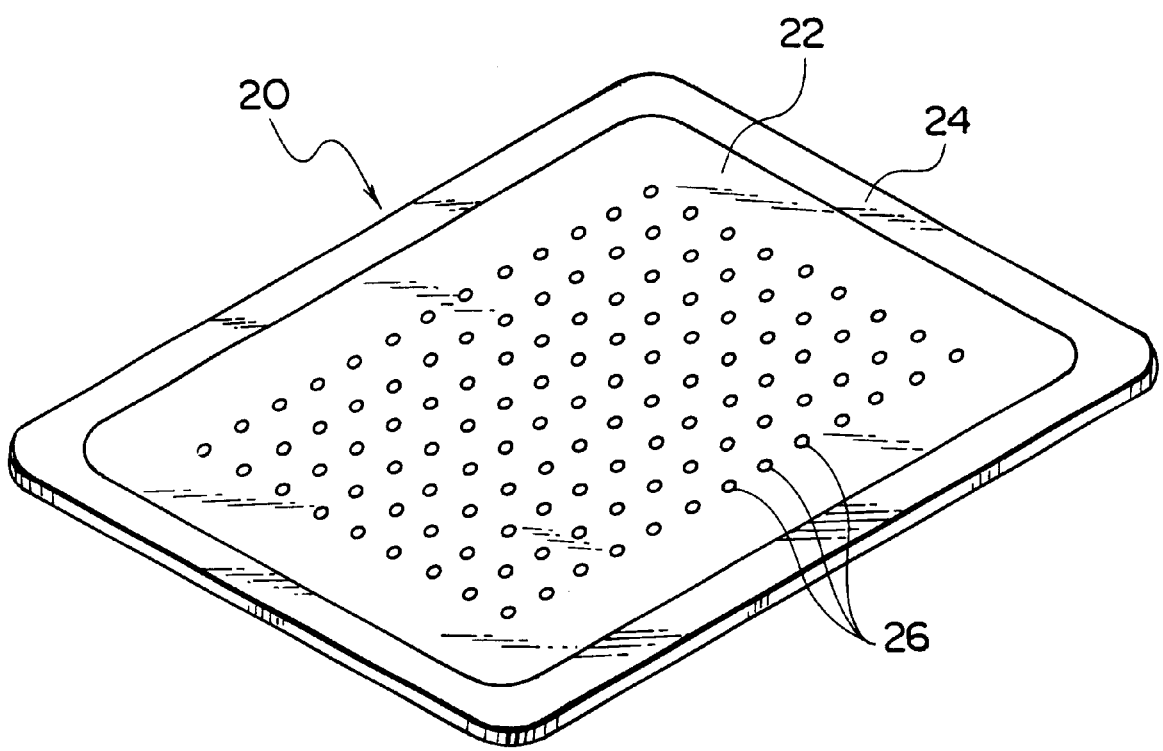
FIG. 3 is a perspective view of an element holder used in the process for production of a stacked ceramic capacitor.

The capacitor element 4 before formation of the terminal electrodes 6 and 8 is held by the element holder 20 shown in FIG. 3. The element holder 20 has a rubber sheet 22 formed with a plurality of holding through holes 26 and a frame 24 supporting the periphery of the rubber sheet 22. The frame 24 is comprised by a metal such as stainless steel.

Figure 4:
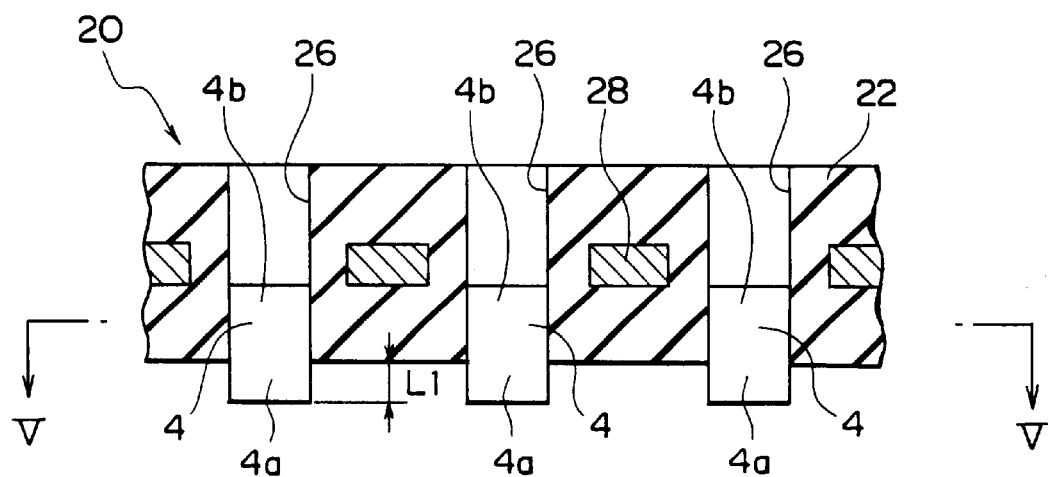
FIG. 4 is a sectional view of key parts of a step of coating an electrode paste on an end of a capacitor element held by the element holder.
Figure 4:
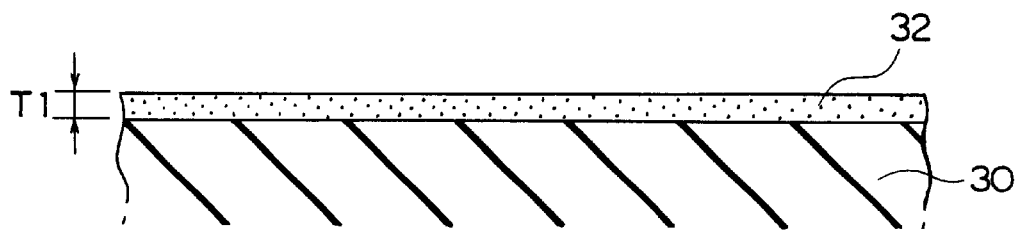
Figure 5:
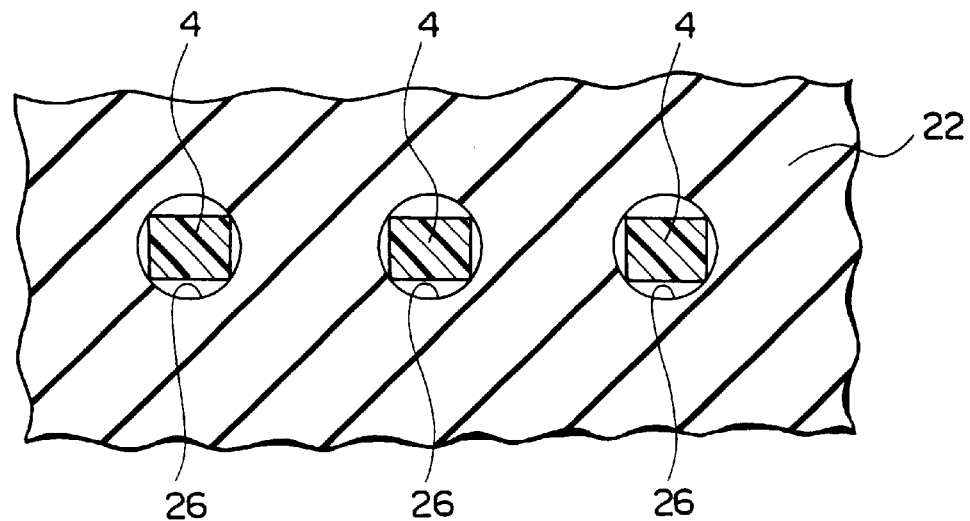
FIG. 5 is a sectional view of key parts along the line V—V in FIG. 4.

The rubber sheet 22 is comprised by a rubber member comprised mainly of a silicone rubber. To maintain the flatness of the rubber sheet 22, as shown in FIG. 4, the rubber sheet 22 may house inside it a reinforcing plate 28 at locations away from the through holes 26. The reinforcing plate 28 is comprised of a metal plate formed with a large number of through holes of inside diameters larger than the through holes 26 of the rubber sheet 22 etc. The reinforcing plate 28 may be formed integrally with the frame 24 shown in FIG. 3 or may be a separate piece. The thickness of the reinforcing plate 28 is smaller than the thickness of the rubber sheet 22. The thickness of the rubber sheet 22 is determined in accordance with the size of the element 4 etc. and is not particularly limited. Further, the sectional shape of the through holes 26 formed in the rubber sheet 22, as shown in FIG. 5, is circular in this embodiment, but the shape is not limited to a circular shape. Various shapes such as elliptical shapes, rectangular shapes, and other polygonal shapes may be used. The sectional shape of the through holes 26 may be changed in various ways in accordance with the sectional shape of the element 4 to be formed with the terminal electrodes.

In the present embodiment, first, the elements 4 are held inside the through holes 26 of the rubber sheet 22. The elements may be inserted until they are buried deep inside the through holes 26, but as shown in FIG. 4, they may also be inserted inside the through holes 26 to an extent where the first ends 4a of the elements 4 project out from the through holes 26.

In this state, the holder 20 holding the elements 4 is placed into the batch type drying furnace for the heat treatment. The heat treatment temperature is, for example, 100° C. to 300° C. and the heat treatment time is, preferably at least 2 minutes. Due to this heat treatment, the wettability of the surface of the elements 4 by the end electrode paste is improved.

Next, as shown in FIG. 4, the rubber sheet 22 is moved in a state with only the first ends 4a of the elements 4 projecting out from the through holes 26 of the rubber sheet 22 by a predetermined length L1 from the first surface 22a of the rubber sheet 22. The first ends of all of the elements 4 held by the holder 20 are immersed in an end electrode paste 32 stored in a paste coater 30. Note that the end electrode paste 32 is comprised of the above-mentioned composition. The predetermined length L1 of the first ends 4a is determined in accordance with the size of the first end electrodes to be formed. When the width of the completed first end electrode 6 shown in FIG. 2 is W1, L1>W1 is required with respect to WI. Further, the thickness T1 of the end electrode paste 32 stored in the paste coater 30 is preferably T1(=W1)<L1× 0.90 with respect to the predetermined length L1.

The paste coater 30 is not particularly limited so long as it can hold at least a predetermined thickness T1 of the paste 32. Any type may be used. For example, as the paste coater 30, a simple container may be used, but, as shown in FIG. 8, a coating roller 42 may also be used. This is because it is possible to form a layer of the end electrode paste 32 of the predetermined thickness T1 at the outer circumferential surface of the coating roller 42 as well. The paste coater 30 preferably has a portion contacting the paste 32 which is comprised of a member having elasticity such as a rubber member. This is because the first ends 4a of the elements 4 are pressed against it.

Figure 6:
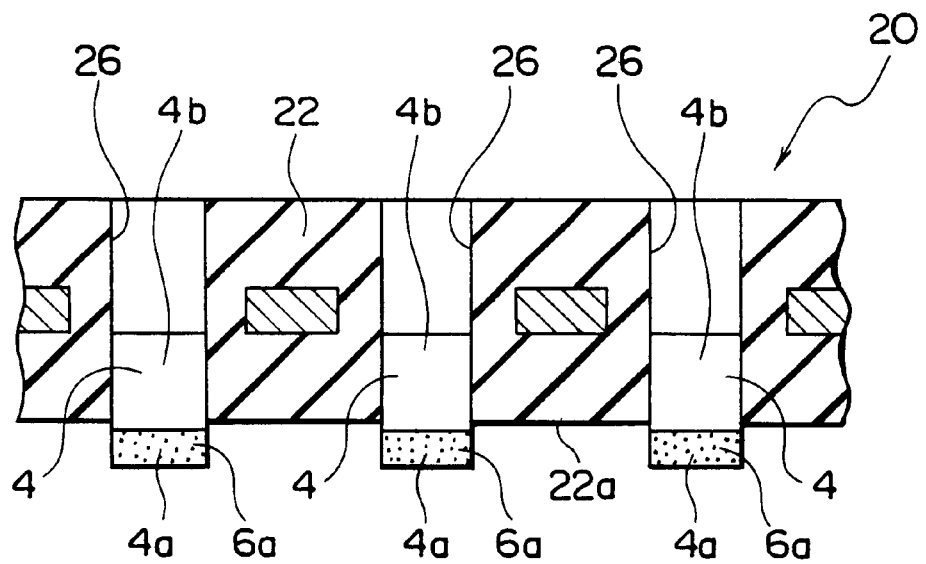
FIG. 6 is a sectional view of key parts of a step after the step shown in FIG. 4.

By immersing the first ends 4a of all of the elements 4 held by the holder 20 in the layer of the paste 32, as shown in FIG. 6, the first ends 4a of the elements 4 are formed with first end electrode paste films 6a. In the past, as shown in FIG. 2, the edge lines 60' of the paste films 6a formed at the first ends 4a of the elements 4 had become wavy or rounded as shown by the two-dot chain lines. In the present embodiment, however, the wettability of the surfaces of the element 4 with respect to the paste 32 is improved by heat treating the elements 4 together with the rubber sheet 22 in a step before coating the paste on the first ends 4a. As a result, as shown by the edge lines 60 shown by the solid lines in FIG. 2, the border line of the paste film 6a becomes straight in the range of the allowable variation ×W.

Next, the holder 20 in the state holding the elements 4 is conveyed inside the drying furnace and the paste films 6a formed on the first ends 4a of the elements 4 are dried. The drying temperature in the drying furnace is substantially the same or lower than the heat treatment temperature when heat treating the elements 4 together with the rubber sheet 22.

Figure 7:
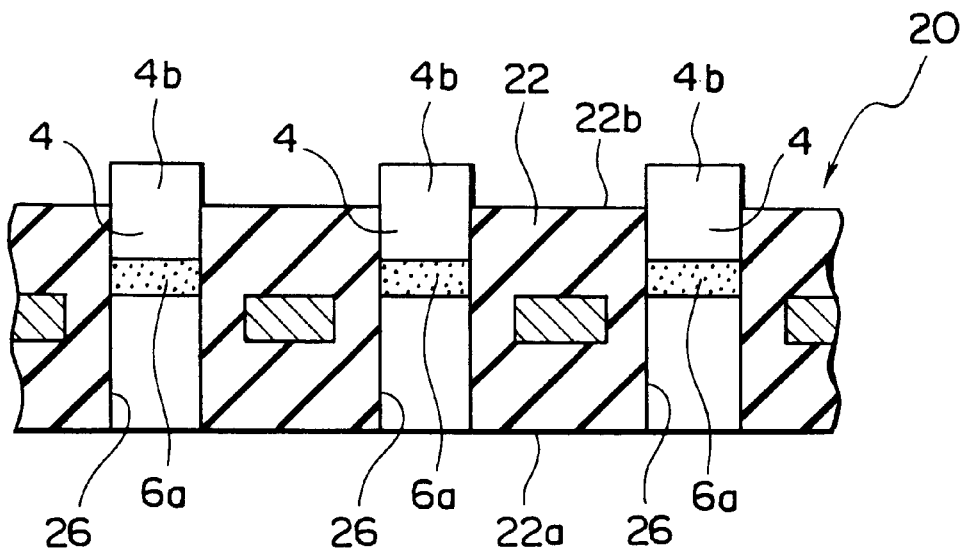
FIG. 7 is a sectional view of key parts of a step after the step shown in FIG. 6.

After the paste films 6a are dried, as shown in FIG. 7, the elements 4 are moved along the insides of the through holes 26 to positions where the second ends 4b of the elements 4 project out from the second surface 22b of the rubber sheet 22. The length of projection of the second ends 4b from the second surface 22b is substantially equal to the predetermined length L1 shown in FIG. 4.

In the state shown in FIG. 7, the front and reverse surfaces of the holder 20 are reversed and the same state as that shown in FIG. 4 is set, then the same procedure is followed as in the above method to coat and then dry the end electrode paste 32 on the second ends 4b of the elements 4.

After the dried paste films have been formed on the two ends of the elements 4, the elements 4 are taken out from the through holes 26 of the rubber sheet 22. Next, the elements are sintered for forming the terminal electrodes. The sintering conditions at that time are, for example, sintering in the air at 600 to 800° C. for 10 minutes to about 1 hour. Further, if necessary, a coating layer is formed on the surfaces of the end electrodes by plating etc. As a result of this sintering, as shown in FIG. 1 and FIG. 2, the stacked ceramic capacitors 2 formed with terminal electrodes 6 and 8 on their two ends are obtained. The stacked ceramic capacitor 2 of this embodiment is then mounted on a printed circuit board by soldering etc. and used for various electronic equipment.

According to the process of production of the stacked ceramic capacitor 2 according to this embodiment, it is possible to reduce the variation of dimensions of the edge lines 60 of the first terminal electrodes 6. Note that the variation in dimensions of the edge lines of the second terminal electrodes 8 is suppressed in the same way as the variation in dimensions of the edge lines 60 of the first terminal electrodes 6 by the heat treatment in the first drying step conducted in the previous step. Therefore, according to the process of production of the present embodiment, it is possible to produce stacked ceramic capacitors 2 improved in reliability and durability with a high production efficiency.

(Second Embodiment)

FIG. 8 shows an example of an apparatus for performing the steps of coating and drying the terminal electrode paste on the ends of the elements 4 held in the element holder 20.

As shown in FIG. 8, the element holder 20 holding the large number of elements 4 with the ends of the elements 4 projecting out upward can be conveyed from the left side to the right side in FIG. 8 by the conveyor roller 50. The element holder 20 first enters the heat treatment furnace 40. The heat treatment furnace 40 has the same structure as the drying furnace 46 and heat treats the holder 20 holding the elements 4 before the two ends are coated with paste. The heat treatment conditions are the same as the case of the first embodiment.

Near to the right of the heat treatment furnace 40 is positioned a coating roller 42 for coating the end electrode paste. The outer circumference of the coating roller 42 is supplied with an end electrode paste from the paste supplier 44. A layer of the paste 32 is formed in the same way as the paste coater 30 shown in FIG. 4. The top surface of the holder 20 contacts the bottom outer circumference of the rotating roller 42 when passing it, whereby the paste film 6a shown in FIG. 6 is formed on the first ends 4a of the elements 4 held by the holder 20. Next, the holder 20 is conveyed by the conveyor roller 50 to the inside of the drying furnace 46. In the drying furnace 46, the paste films 6a are dried under the same conditions as with the first embodiment.

After the drying in the drying furnace 46 is completed, in the same way as the first embodiment, the end electrode paste is coated and dried on the second ends of the elements 4. Before the step of coating the end electrode paste on the second ends 4b of the elements 4, however, there is no need for passing through the heat treatment furnace 40.

In the process for production of a stacked ceramic capacitor according to the present embodiment as well, in the same way as the first embodiment, it is possible to reduce the variation in dimensions of the edge lines 60 of the first terminal electrodes 6. Note that the variation in dimensions of the second terminal electrodes 8 is suppressed in the same way as the variation in dimensions of the edge lines 60 of the first terminal electrodes 6 by the heat treatment in the first drying step in the drying furnace 46. Therefore, according to the process of production according to this embodiment as well, in the same way as the first embodiment, it is possible to produce stacked ceramic capacitors 2 improved in reliability and durability with a high production efficiency.

(Third Embodiment)

In this embodiment, before mounting the elements 4 shown in FIG. 4 in the element holder 20, the elements 4 are immersed in a stock solution of silicone oil or a stock solution of silicone oil diluted by a solvent, then dried as necessary to cause the solvent to evaporate. Next, the elements 4 are mounted in the element holder 20 and the end electrode paste is coated on the first ends 4a of the elements 4 without heat treatment. The rest of the production process is the same as that of the first embodiment.

The solvent used for diluting the stock solution of the silicone oil is not particularly limited, but for example, ethanol is preferably used. Further, the ratio of weight of the stock solution of the silicone oil and the solvent is not particularly limited, but 1:100 to 1:1000 or so is preferable.

In the process of production of the stacked ceramic capacitor according to this embodiment as well, like in the first embodiment, it is possible to reduce the variation in dimensions of the edge lines 60 of the first terminal electrodes 6. Note that the variation in dimensions of the edge lines of the second terminal electrodes 8 is suppressed in the same way as the variation in dimensions of the edge lines 60 of the first terminal electrodes 6 by the heat treatment conducted in the first drying step in the drying furnace 46. Therefore, according to the process for production according to the present embodiment, in the same way as the first embodiment, it is possible to produce stacked ceramic capacitors 2 improved in reliability and durability at a high production efficiency.

(Other Embodiments)

Note that the present invention is not limited to the above embodiments and may be modified in various ways.

For example, in the above first and second embodiments, the capacitor elements 4 and rubber sheet 22 were heat treated in contact with each other, but the advantageous effect of the present invention may be expected to be obtained by heat treatment of the capacitor elements 4 and rubber sheet 22 in a non-contact state as well.

Further, in the above embodiments, a multilayer ceramic capacitor was illustrated as the electronic component having terminal electrodes, but the electronic components produced by the process of production of the present invention are not limited to multilayer ceramic capacitors. The present invention may be applied to all cases of production of electronic components having terminal electrodes such as chip varistor, chip thermistor, chip resistor, chip inductor, and other electric parts of surface mounted device (SMD) type chip.

EXAMPLES

Next, specific examples of the present invention will be given to explain the present invention in more detail, but the present invention is not limited to these examples.

Example 1

First, the capacitor element 4 shown in FIG. 1 was prepared. First, a dielectric material comprised mainly of barium titanate, an acrylic resin, methylene chloride, ethyl acetate, mineral spirit, and acetone were mixed by a ball mill to obtain a dielectric layer paste.

Next, for the internal electrode paste, nickel particles of an average particle size of 0.2 to 0.8 $\mu$m, an organic vehicle (ethylene cellulose resin dissolved in butyl carbitol), and butyl carbitol were kneaded by a roll to form a paste.

For the terminal electrode paste, copper particles of an average particle size of 0.5 $\mu$m, an organic vehicle (ethylene cellulose resin dissolved in butyl carbitol), and butyl carbitol were kneaded to form a paste.

Next, the above-mentioned dielectric layer paste was used to form green sheets of thicknesses of 15 $\mu$m on a polyethylene terephthalate film, the internal electrode paste was printed on these, then the green sheets were peeled off the polyethylene terephthalate film. Next, a plurality of green sheets were stacked and pressed together for bonding to prepare a stack of the green sheets. There were four layers of green sheets having internal electrodes stacked.

Next, the stack of the green sheets was cut to predetermined sizes, treated to remove the binder, sintered, and annealed to obtain capacitor elements 4 comprised of the sintered stacked ceramic. The dimensions of the capacitor elements 4 were those of a rectangular parallelipiped of 1.0×0.5×0.3 mm.

The treatment for removing the binder was performed at a rate of temperature rise of 15° C./hour, a holding temperature of 280° C., a holding time of 8 hours, and an air atmosphere. Further, the sintering was performed at a rate of temperature rise of 200° C./hour, a holding temperature of 1380° C., a holding time of 2 hours, a cooling rate of 300° C./hour, and a reducing atmosphere. The annealing was performed at a holding temperature of 900° C., a holding time of 9 hours, a cooling rate of 300° C./hour, and an oxidizing atmosphere.

Next, the two ends 4a and 4b of these capacitor elements 4 were polished by sand blasting, then the elements 4 were inserted completely inside the through holes 26 formed in the rubber sheet 22 of the element holder 20 shown in FIG. 3. The material of the rubber sheet 22 was silicone rubber. As the element holder 20, specifically product made by Paloma Inc. was used.

In this state, the holder 20 was placed in a drying furnace together with the elements 4 where they were heat treated at an atmospheric temperature of 100° C. The heat treatment time was 5.0 minutes.

Next, only the first ends 4a of the elements 4 were made to project out from the through holes 26 of the rubber sheet 22 by a predetermined length L1 (=0.5 mm) from the first surface 22a of the rubber sheet 22. In that state, the holder 20 was moved and the first ends of all of the elements 4 held by the holder 20 were immersed in an end electrode paste 32 (thickness T1=100 μm) stored in a paste coater 30.

Next, the holder 20 in the state holding the elements 4 was conveyed inside a drying furnace where the paste films 6a formed on the first ends 4a of the elements 4 were dried. The drying temperature in the drying furnace was 100° C. and the drying time was 5.0 minutes.

After the drying of the paste films 6a, as shown in FIG. 7, the elements 4 were moved along the insides of the through holes 26 to positions where the second ends 4b of the elements 4 projected out from the second surface 22b of the rubber sheet 22. The length of projection of the second ends 4b from the second surface 22b was substantially equal to the predetermined length Li shown in FIG. 4.

In the state shown in FIG. 7, the front and reverse surfaces of the holder 20 were reversed and the same state as that shown in FIG. 4 was set, then the same procedure was followed as in the above method to coat and then dry the end electrode paste 32 on the second ends 4b of the elements 4.

After the dried paste films had been formed on the two ends of the elements 4, the elements 4 were taken out from the through holes 26 of the rubber sheet 22. Next, the elements were sintered for forming the terminal electrodes. The sintering was performed in a mixed gas of for example moisturized nitrogen gas and hydrogen gas at 800° C. for 10 minutes to produce the stacked ceramic capacitors 2 shown in FIG. 1.

Thirty samples of the thus obtained stacked ceramic capacitors 2 were measured by a microscope for the variation in dimensions ΔW of the edge lines 60 of the first end electrodes 6 shown in FIG. 2 to find the minimum and maximum variations. The results are shown in the following Table 1. As shown in Table 1, the variation in dimensions ΔW was 90 to 190 μm.

TABLE 1

|  | Treatment temperature | Variation ΔW of edge line |
| --- | --- | --- |
| Ex. 1 Silicone rubber support | 100 ° C. | 90 to 190 μm |
| Ex. 2 Silicone rubber support | 150 ° C. | 90 to 100 μm |
| Ex. 3 Silicone rubber support | 200 ° C. | 1 to 38 μm |
| Ex. 4 Silicone rubber support | 250 ° C. | 1 to 40 μm |
| Ex. 5 Silicone oil immersion | Ordinary temperature 25 ° C. | 1 to 35 μm |
| Ex. 6 Silicone oil:solvent 1:200 | 200 ° C. | 0 to 42 μm |
| Ex. 7 Silicone oil:solvent 1:500 | 200 ° C. | 0 to 36 μm |

TABLE 1-continued

|  | Treatment temperature | Variation ΔW of edge line |
| --- | --- | --- |
| Comp. Ex. 1 Silicone rubber support | Ordinary temperature 25 ° C. | 100 to 200 μm |
| Comp. Ex. 2 Heating capacitor element alone | 200 ° C. | 110 to 190 μm |

Example 2

The same procedure was followed as in Example 1 to produce stacked ceramic capacitors 2 except for making the heat treatment temperature 150° C. before coating the end electrode paste on the first ends 4a of the elements 4.

The variation in dimensions ΔW of the edge lines 60 of the first end electrodes 6 shown in FIG. 2 was measured in the same way as in Example 1. The results are shown in Table 1. As shown in Table 1, the variation in dimensions ΔW was 90 to 100 μm.

Example 3

The same procedure was followed as in Example 1 to produce stacked ceramic capacitors 2 except for making the heat treatment temperature 200° C. before coating the end electrode paste on the first ends 4a of the elements 4.

The variation in dimensions ΔW of the edge lines 60 of the first end electrodes 6 shown in FIG. 2 was measured in the same way as in Example 1. The results are shown in Table 1. As shown in Table 1, the variation in dimensions ΔW was 1 to 38 Δm.

Example 4

The same procedure was followed as in Example 1 to produce stacked ceramic capacitors 2 except for making the heat treatment temperature 250° C. before coating the end electrode paste on the first ends 4a of the elements 4.

The variation in dimensions ΔW of the edge lines 60 of the first end electrodes 6 shown in FIG. 2 was measured in the same way as in Example 1. The results are shown in Table 1. As shown in Table 1, the variation in dimensions ΔW was 1 to 40 Δm.

Example 5

Before mounting the elements 4 in the element holder 20, the elements 4 were immersed in a stock solution of silicone oil (TSF—type made by Toshiba Silicon Co., Ltd.), then allowed to stand at ordinary temperature 25° C. for 5.0 minutes. Next, the elements 4 were mounted in the element holder 20, then the same procedure was followed as in Example 1 to produce stacked ceramic capacitors 2 except for coating the end electrode paste on the first ends 4a of the elements 4 without heat treatment.

The variation in dimensions ΔW of the edge lines 60 of the first end electrodes 6 shown in FIG. 2 was measured in the same way as in Example 1. The results are shown in Table 1. As shown in Table 1, the variation in dimensions ΔW was 1 to 35 μm.

Example 6

Before mounting the elements 4 in the element holder 20, the elements 4 were immersed in a stock solution of silicone oil (TSF—type made by Toshiba Silicon Co., LTd.) diluted by a solvent, then dried at 200° C. for 5.0 minutes to evaporate the solvent. Next, the elements 4 were mounted in the element holder 20, then the same procedure was followed as in Example 1 to produce stacked ceramic capacitors 2 except for coating the end electrode paste on the first ends 4a of the elements 4 without heat treatment. As the solvent for diluting the stock solution of the silicone oil, ethanol was used. The ratio of weight of the stock solution of the silicone oil and the solvent was 1:200.

The variation in dimensions ΔW of the edge lines 60 of the first end electrodes 6 shown in FIG. 2 was measured in the same way as in Example 1. The results are shown in Table 1. As shown in Table 1, the variation in dimensions ΔW was 0 to 42 μm.

Example 7

Before mounting the elements 4 in the element holder 20, the elements 4 were immersed in a stock solution of silicone oil (TSF—type made by Toshiba Silicon Co., Ltd.) diluted by a solvent, then dried at 200° C. for 5.0 minutes to evaporate the solvent. Next, the elements 4 were mounted in the element holder 20, then the same procedure was followed as in Example 1 to produce stacked ceramic capacitors 2 except for coating the end electrode paste on the first ends 4a of the elements 4 without heat treatment. As the solvent for diluting the stock solution of the silicone oil, ethanol was used. The ratio of weight of the stock solution of the silicone oil and the solvent was 1:500.

The variation in dimensions ΔW of the edge lines 60 of the first end electrodes 6 shown in FIG. 2 was measured in the same way as in Example 1. The results are shown in Table 1. As shown in Table 1, the variation in dimensions ΔW was 0 to 36 μm.

Comparative Example 1

The same procedure was followed as in Example 1 to produce stacked ceramic capacitors 2 except before coating the end electrode paste on the first ends 4a of the elements 4, the elements were held at ordinary temperature 25° C. without any heat treatment.

The variation in dimensions ΔW of the edge lines 60 of the first end electrodes 6 shown in FIG. 2 was measured in the same way as in Example 1. The results are shown in Table 1. As shown in Table 1, the variation in dimensions ΔW was 100 to 200 Δm.

Comparative Example 2

The same procedure was followed as in Example 1 to produce stacked ceramic capacitors 2 except before mounting the elements 4 in the element holder 20, the elements 4 were heat treated alone at 200° C. for 5.0 minutes, then the elements 4 cooled to ordinary temperature were mounted in the element holder 20 and the first ends 4a were coated with the end electrode paste.

The variation in dimensions ΔW of the edge lines 60 of the first end electrodes 6 shown in FIG. 2 was measured in the same way as in Example 1. The results are shown in Table 1. As shown in Table 1, the variation in dimensions ΔW was 110 to 190 μm.

Evaluation

As shown in Table 1, according to the processes of production of Examples 1 to 7, it was confirmed that it was possible to suppress the variation in edge lines of the terminal electrodes compared with the processes of production of Comparative Examples 1 and 2.

What is claimed is:

1. A process for production of an electronic component having a terminal electrode comprising the steps of:
   heat treating (1) an electronic component element having no terminal electrode, and (2) a rubber member at 80 to 300° C. for at least 2 minutes, wherein the electronic component element is in a state held by the rubber member or in a non-contact state with the rubber member,
   coating an electrode paste on the heat treated element in a state held by said rubber member, and
   drying the element coated with the electrode paste, thereby forming said terminal electrode.

2. A process for production of an electronic component as set forth in claim 1, wherein the rubber member is comprised of a member comprised mainly of a silicone rubber.

3. A process for production of an electronic component as set forth in claim 1, wherein the element is a capacitor element formed by alternately laminating an internal electrode layer and a dielectric layer.

4. A process for production of an electronic component having terminal electrodes comprising the steps of:
   heat treating (1) an electronic component element having no terminal electrode and (2) a rubber member at 80 to 300° C. for at least 2 minutes, wherein the electronic component element is in a state held by the rubber member or in a non-contact state with the rubber member,
   coating a first terminal electrode paste on a first end of the heat treated element in a state held by said rubber member,
   drying the element coated with the first terminal electrode paste,
   coating a second terminal electrode paste on a second end of the element in a state held by said rubber member, and
   drying the element coated with the second terminal electrode paste on the second end, thereby forming said terminal electrodes.

5. A process for production of an electronic component as set forth in claim 4, wherein the heating temperature at the heat treatment step is substantially the same as the drying temperature in the steps of drying.

6. A process for production of an electronic component as set forth in claim 4, wherein the rubber member is comprised of a member comprised mainly of a silicone rubber.

7. A process for production of an electronic component as set forth in claim 4, wherein the element is a capacitor element formed by alternately laminating an internal electrode layer and a dielectric layer.

8. A process for production of an electronic element having a terminal electrode comprising the steps of:
   heat treating an electronic component element having no terminal electrode at 80 to 300° C. for at least 2 minutes, in contact with a silicone rubber,
   coating an electrode paste on the heat treated element, and
   drying the element coated with the electrode paste, thereby forming said terminal electrode.

9. A process for production of an electronic component as set forth in claim 8, wherein the element is a capacitor element formed by alternately laminating an internal electrode layer and a dielectric layer.

10. A process for production of an electronic component having terminal electrodes comprising the steps of:
   heat treating (1) an electronic component element having no terminal electrode, and (2) a rubber member, wherein the electronic component element is in a state held by the rubber member or in a non-contact state with the rubber member, coating a first terminal electrode paste on a first end of the heat treated element in a state held by said rubber member, drying the element coated with the first terminal electrode paste, coating a second terminal electrode paste on a second end of the element in a state held by said rubber member, and drying the element coated with the second terminal electrode paste on the second end, thereby forming said terminal electrodes, wherein the heating temperature at the heat treatment step is substantially the same as the drying temperature in the steps of drying.

11. A process for production of an electronic component as set forth in claim 10, wherein the heating temperature in the heat treatment step is 80 to 300° C. and the heat treatment time is at least 2 minutes.

12. A process for production of an electronic component as set forth in claim 10, wherein the rubber member is comprised of a member comprise mainly of a silicone rubber.

13. A process for production of an electronic component as set forth in claim 10, wherein the element is a capacitor element formed by alternately laminating an internal electrode layer and a dielectric layer.

14. A process for production of an electronic component having a terminal electrode comprising the steps of:

immersing an electronic component element in a solution containing a silicone oil, coating an electrode paste on the element, and a drying step of drying the element coated with the electrode paste, thereby forming said terminal electrode, wherein after the step of immersing, the element is dried, then the step of coating is performed.

15. A process for production of an electronic component as set forth in claim 14, wherein the element is a capacitor element formed by alternately laminating an internal electrode layer and a dielectric layer.

* * * * *